INVENTOR.
FRED E. SAKALAY
BY
John W Armbruster
ATTORNEY

United States Patent Office 3,422,402
Patented Jan. 14, 1969

3,422,402

MEMORY SYSTEMS FOR USING STORAGE DEVICES CONTAINING DEFECTIVE BITS

Fred E. Sakalay, Poughkeepsie, N.Y., assignor to International Business Machines Corporation, Armonk, N.Y., a corporation of New York

Filed Dec. 29, 1965, Ser. No. 517,264
U.S. Cl. 340—172.5 9 Claims
Int. Cl. G11b *13/00*

ABSTRACT OF THE DISCLOSURE

A memory control system wherein memory devices containing defective elements or components are arranged to operate reliably. The system includes a main memory for storing a plurality of multibit data and a first memory address register for selecting address locations in the main memory. There are further provided a second memory address register with extra substitute address locations connected to the main memory, a large read only memory device having extra capacity with extra good address locations adapted to be substituted for address locations having defective bits, and an arrangement for directing an address with defective bits into a substitute position of the read only memory device and out to the second memory address register in the extra substitute address locations for changed and corrected interrogation of the main memory.

This invention relates to memory systems for data processing equipment and more particularly to data memory devices, systems, and methods for operating to store and recall data in a reliable fashion even though certain portions or bits of the memory systems storage devices are defective.

When small delicate elements such as the bit storage elements of a memory array are produced in large quantities by mass production techniques, there is the probability that a certain percentage of the elements are likely to be defective because of the critical demands for uniformity. And since a final assembly often includes a large number of arrays, if there is even the slightest chance that a component is defective, the probability that the whole storage system contains one or more defective components is greatly expanded.

The individual elements, devices and arrays are subjected to demanding tests before assembly; however, such tests sometimes fail to eliminate all the defective components especially those made defective in the process of assembly. The problem is accentuated when memory arrays are manufactured by batch or bulk techniques such as mass electroplating, printed circuit, or thin film evaporation techniques and the like. When a memory array is made by such bulk techniques, each small memory element in the device cannot be tested before it becomes a part of the array and therefore the defective elements cannot economically be eliminated before they become part of a memory system. It would be too expensive to discard entire array systems because a few elements fail to meet operating standards.

The present invention provides memory control systems wherein memory devices containing defective elements or components are arranged to operate reliably. In other words, the present invention provides means whereby accurate data storage and recall can be effected even though the memory system includes bad bits and defective memory devices. It provides means for automatically accommodating for faulty or defective memory devices without any interruption or change in the machine's program or intervention by the operator.

One feature of the present invention deals with the rearrangement of memory addresses to correct for bad bits in the memory array. A memory array is made larger than necessary to provide substitute storage locations for bad addresses. A decoder is supplied so that the bad locations are never addressed; i.e., the address input is decoded to a decimal output which is fed to a 1 bit read only memory. The read only memory output then has a 1 for 1 correspondence to its input for all good addresses. If the input is a bad address, its decimal value is changed to an excess placement in the read only memory and then the output therefrom is coded back into binary and used as a new memory address wherein all good data bits are found. This technique requires that each memory access be routed through a large read only memory wherein there is one bit word for each main memory word. The basic principle of the scheme may be understood by considering the memory as having $n'$ locations and $n \times m$ good addresses. The $n$ to $n'$ excess alternate address bit would be used directly as substitute good address locations in the main memory. By rearranging the addresses so that all bad addresses are grouped at the high end of the address spectrum, i.e., beyond the $n$ portion into an $n' \times m'$ portion, these bad addresses could become inaccessible if the addressing capability of the memory is restricted to the $n \times m$ addresses.

According to another system of substitution control of the present invention, a manual selection panel is provided into which all input memory address register lines are brought and, depending upon the locations of bad addresses, jumpers are inserted in the panel to complete the connection to a decoder for coding to an address in a redundant memory device. In this system, because of parallel conections, whenever a valid address is placed in the address register, a normal memory cycle is executed and the main memory is accessible. If the address register contains an invalid address, the bad address decoder inhibts the access to the main memory and causes a substitute address to find access to data in a redundant memory. The provision of the bad address decoder eliminates the need for an extra cycle each time a bad address is interrogated. Since each mass memory built will have a different set of bad locations, a universal decoder would be impractible; however, through the use of a manual selection panel, the decoder of the present technique is of a reduced size. All memory address register lines are brought into a pluggable panel and depending on the locations of bad addresses, jumpers are inserted to complete the connection to the decoder and redundant memory. Thus, the selection panel will be wired differently for each memory array.

According to another feature of the present invention, an improved method is involved by means of indirect memory addressing using a read only memory in either serial or parallel mode. In either mode, indirect addressing from the memory address register is directed into and through a read only memory which contains the address of a valid memory location in lieu of any bad bit location sought by the memory address register directive. This valid alternate address is then used to interrogate the main memory. Since most addresses will be valid, time can be saved by interrogating both the read only memory and the main memory in parallel. In this parallel mode, if the memory address register contains a valid address, the read only memory output is used merely to supply a gate signal to the main memory output register. However, if the memory address register contains an address having inoperative bits, the read only memory emits an alternate address which replaces the address in the address register. When operating in the parallel mode, this technique has the advantages of taking extra time only for bad addresses and not being restricted by the number of bad bits per word.

An object of the present invention is to provide improved memory systems which are capable of reliable operation even though they contain defective bit areas, films, spots or components.

Another object of this invention is to provide improved memory systems capable of automatically accommodating for defective memory locations.

It is a further object of this invention to provide improved memory systems in which defective memory locations may be accommodated without program control.

Still another object of the present invention is to provide improved memory systems adapted to use arrays with good and bad elements fabricated by modern bulk techniques.

Still another object of the present invention is to provide simple, reliable, and inexpensive addressing systems of compensating for defective memory bits.

The foregoing and other objects, features and advantages of the invention will be apparent from the following more particular description of the preferred embodiments of the invention as illustrated in the accompanying drawings.

As a general statement of the systems of the invention set forth herein, it may be noted they all provide some means of detour addressing away from locations with bad bits and providing instead alternate addresses with good operative bits. Among the several styles of operation, there is the one by excess size of an intermediate read only memory which enables avoidance of bad bit address locations, and secondly by plugging bad to good substitute locations and data as provided by a redundant memory, and thirdly there is the indirect approach to the main memory through a read only memory which provides an alternate address.

Figure 1:
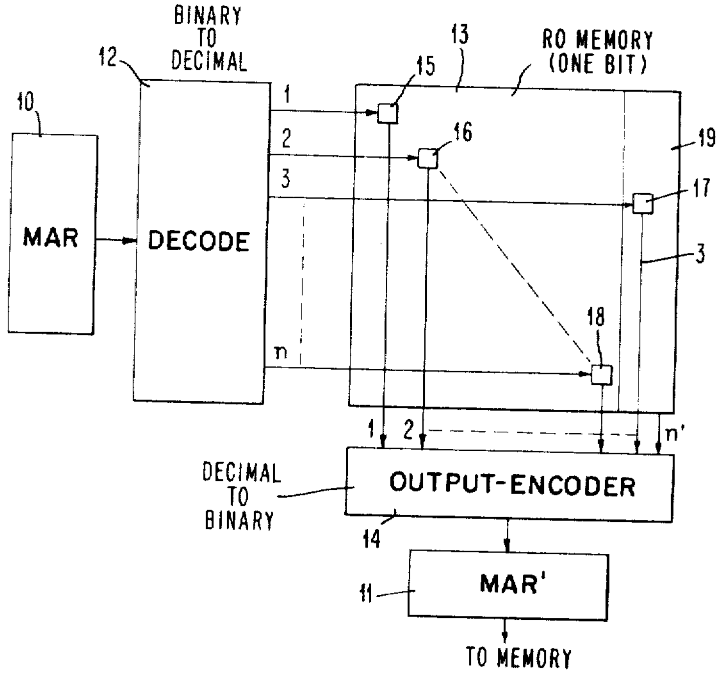
FIG. 1 is a diagrammatic illustration of the system wherein a read only memory has extra bit positions sufficient to replace all defective address representing bit positions, and decoder and encoder devices are associated therewith to properly direct the binary encoded address to a good single decimal bit location of the read only memory and out again in binary form.

Referring first to FIG. 1, the memory address registers 10 and 11 identified in this figure as MAR and MAR′ are conventional memory address registers which store in binary form the address of a word to be read out of the main memory. Interposed between the two registers mentioned, are decoder 12, read only memory 13, and another encoder 14 in the order mentioned. The interposed read only memory 13 as shown is of a special form providing what would be a normally sufficient left area taking up a number of bit positions provided for a number of decimal locations such as 15 and 16 and up to location 18 which might be identified as lines 1, 2, 3 . . . *n*; and having additional extended capacity in means shown diagrammatically as right portion 19 which includes several excess bits such as the special excess bit 17 substituting for the bad bit decimal address number "3" which was previously tested and identified as including bad bits in the memory. Several such substitute address bit positions as bit position 17 may be provided in the area 19 of the read only memory and they increase the capacity in a decimal fashion of the memory unit to include positions 1, 2, . . . *n′*. The difference between *n* and *n′* is a number of positions amounting to the excess storage capacity to take care of a number of defective memory locations, which number may have been found by experience to be required in excess of the 1, 2, . . . *n* positions as the usual capacity of address memory positions.

The purpose of the decoder 12 is to change the address code from the usual binary scheme as it appears in the register 10 to a decimal notation as an output of the decoder 12. In such a decimal form it is possible for each auxiliary memory location to be represented as a single bit and therefore have one of the bits 15, 16, etc., represent a full address location notation. Whenever the decimal location selected is one known to be of good bits, there is a direct circuit relationship as shown with lines 1 and 2 running to the memory bits 15 and 16 and directly therefrom vertically dowtward into an encoder 14. However, when it is found that the decimal output such as "3" is one selective of bad bit position, that line is continued over into the excess storage portion 19 of the read only memory 13 and there at that alternative selection location 17 there is provided a substitute for the usual "3" position. Therefore, the vertical line 3′ is one of several excess *n-n′* position circuits provided in excess of the usual positions to provide substitute or alternative addresses for other than bad bit locations. The vertical lines are of decimal output form and they run into the output encoder 14 which is of the decimal to binary form to convert the address location data back into binary form where it is respective to the expanded MAR′ memory address register 11 which is in turn connected to the main memory to pick out the desired data at the selected address.

It is seen that by the rearrangement of the memory addresses in FIG. 1, there is a correction for the bad bits in a memory. The memory is made larger than necessary in order that extra locations may be provided to make up for defective bit locations. The decoder is supplied so that the bad bit locations are never addressed. The address is decoded to decimal outputs which are sent to a one bit decimal read only memory 13. The read only memory output to encoder 14 has a 1 for 1 correspondence to the corresponding input for all good addresses. If the input is associated with a bad bit address, its decimal value is changed by directing it into the excess portion 19 of substitute address lines of the read only memory. The changed output is then coded into binary notation and into MAR′ to be used as a new substitute memory address.

This system shown in FIG. 1 also lends itself to rearranging of addresses in enlarged address notation scope so that the bad bit addresses are grouped at the high end of the address notation spectrum. The defective addresses become inaccessible if the addressing capability of the memory is held to the valid 1, 2, . . . *n* addresses. Thus, it is assured that all of the accessible addresses in the memory are good bit holding locations.

Figure 2:
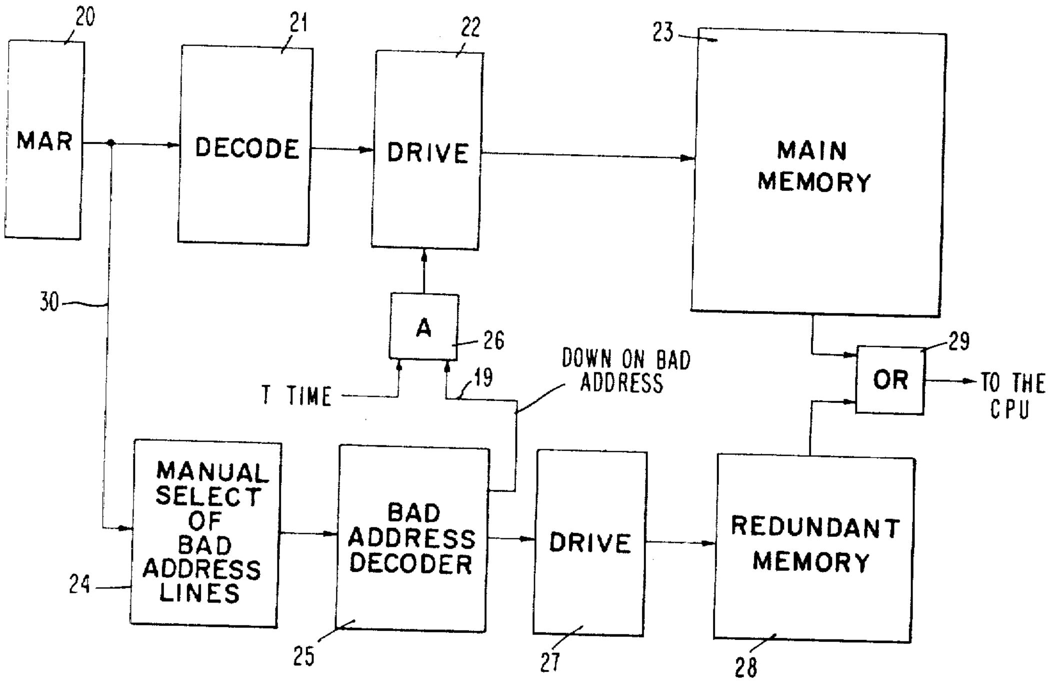
FIG. 2 is a diagrammatic illustration of another form of system wherein there is provided a manual address line selection panel. If the memory address register contains a defective address, the decoder inhibits the usual main memory access and causes substitute data to be read out of a redundant memory.

FIG. 2 illustrates in a diagrammatic fashion another memory system involving bad bit avoidance or elimination. A manual selection panel 24 is provided into which all memory address register lines are brought and depending upon the locations of such bad bit addresses, jumpers are inserted to complete the connection to a bad address decoder 25. Whenever a valid address is placed in the memory address register, a normal memory cycle is executed directly from left to right as seen along the top of the figure wherein the lines go from the MAR register 20 to decoder 21 to driver 22 and directly into the main memory 23. However, if the memory address register 20 contains an invalid address involving bad bits, there is a parallel line 30 to and through a panel 24 and the bad address decoder 25 which has a bad address line 19 to an AND circuit 26 with timing T to inhibit the driver 22 of the usual memory selection control and instead the substitute address selection is directed through driver 27. Driver 27 picks up the substitute access address in a redundant memory 28, the reliable data store of which in turn is directed through OR circuits 29 so that the central processing unit CPU receives data directions from memory 28 rather than the main memory 23.

In FIG. 2, it is seen that simultaneously with the attempt to address the main memory 23 from the memory address register 20, a parallel line 30 calls in the manual pluggable jumper panel 24 to determine if the selected address is a valid one, and if not, to inhibit the usual driver connection and instead substitute an alternate connection. The units 20, 21, 22 and 23 are conventional and function in the usual fashion most of the time. It is only when an address of questionable bit storage merit is called for that the parallel connections are called into play through the line 30, etc. The manual selection panel 24 is so made that when a bad word address is stored in register 20, the manual selection panel 24 will convert this particular address into an address usable by the bad address decoder 25 to provide a bit address to the redundant memory 28. As an example, let it be assumed that at address B in the main memory 23, a word is stored and which a bit 4 is a bad bit. When address B is directed to the unit 24, this unit will convert the address B to an address B′ which is an address in the redundant memory 28 wherein the correct binary 4 may be stored. The binary 4 is read out of the redundant memory 28 and sent to the CPU by way of the OR circuit 29. The bad address decoder 25 may have as an output thereof, a number of output lines equal to the number of the data bits of the word to be read out from the main memory.

If a good address is stored in the register 20, the panel 24 ignores such a good address since it is not plugged or wired to handle acceptable addresses. Consequently no output will be received from the decoder 25 or the redundant memory 28 under such circumstances.

The bad address decoder 25 of FIG. 2 eliminates the need for an extra cycle each time a bad address is interrogated. Because each memory built will have a different set of bad locations (these are located by an array test) an all inclusive decoder would be impractible. Through the use of a manual selection panel such as panel 24 this decoder 25 of FIG. 2 is significantly reduced in size. All memory address register lines from register 20 are brought into this panel 24 and depending on the locations of bad addresses, jumpers are inserted to complete the connection to the decoder. Thus, the selection panel will be wired differently in each memory system. Whenever a valid address is placed in register 20, a normal memory cycle is executed and the main memory 23 is accessed. If register 20 contains an invalid address, the bad address decoder 25 via line 19 and AND circuit 26 inhibits the main memory access and causes a substitute address to be read out of the OR circuit 29. A variation of this scheme would be to read both memories 23 and 28 when the register 20 contains a bad address and then have the appropriate word selected at the output. An advantage in using this particular bad address decoder is that redundant address memory cycles are handled just the same as the normal memory cycles.

Figure 3:
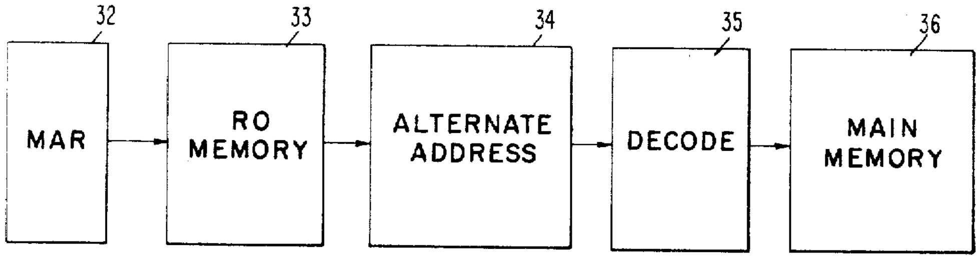
FIG. 3 is a diagrammatic representation of another form of bit correction scheme involving indirect memory addressing using a read only memory operating in a serial mode of operation.
Figure 4:
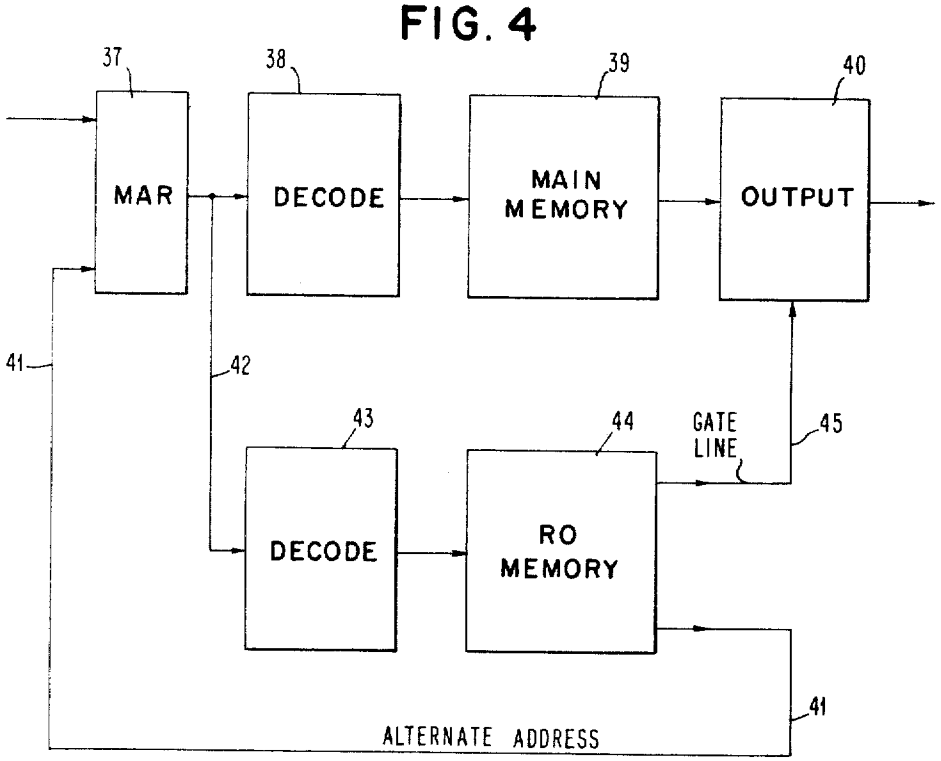
FIG. 4 is a diagrammatic representation of another system of correcting devices wherein time is saved by interrogating both a read only memory and a main memory in parallel by the indirect memory addressing scheme.

FIGS. 3 and 4 refer in general to systems for using memories with bad bits involving an indirect address method. In FIG. 3 the memory address register 32 is connected to a read only memory 33 where the addresses of valid and invalid memory locations are stored. Should the selected memory location involve bad bits, then an alternative is provided through the substitution in a secondary alternate address register, AAR also identified as by reference numeral 34, holding alternate addresses. This provides an indirect path between memory address register 32 and the main memory 36 with all such address selections going through the decoder 35. However, any address location involving bad bits is filtered out or detoured between memory 33 and register 34 wherein an alternative address is provided to interrogate the main memory 36.

Since most addresses will be valid, time may be saved by interrogating both the indirect read only memory 44 and the main memory 39 in parallel as shown in FIG. 4. There it is seen that the memory address register 37 is connected directly to the decoder 38 and then on through to the main memory 39 before reaching the output control register device 40. In parallel with the connections between memory address register 37 and device 40 is a line 42 connected to a secondary decoder 43 which is connected to the read only memory 44 containing alternate address data in storage. There is a feed back line 41 which becomes activated when there is an address substitution made and that is carried back from the read only memory 44 to the memory address register 37.

Only alternate addresses for bad main memory locations are stored in the read only memory device 44. If the register 37 contains a valid address, the read only memory 44 is used merely to supply a permissive pulse along a gate line 45 to the main memory output register 40. If on the other hand, the register 37 is set with an invalid address, the read only memory 44 not only fails to provide a gating pulse, but also encodes, selects and emits the alternate address selection along line 41 which is directed into register 37 to replace the address therein and thus direct the substitute address selection through the upper parallel path directly into the alternate location of the main memory 39. In the system of operation just explained in connection with FIG. 4, it is seen that only a small percentage of the memory access cycles will be extended since the bad bit locations are numerically small.

The foregoing indirecting addressing schemes, especially when considered in a parallel mode, presents quite attractive methods of addressing having several advantages such as taking extra time only for bad address, not being restricted by the number of bad bits per word, and furthermore not requiring too much additional structure.

In a prior filed application "Means for Correcting Bad Memory Bits by Bit Address Storage," filed on Dec. 24, 1963 having Ser. No. 333,152 and assigned to the same assignee as the instant application, a technique was described and claimed for operating a mass produced memory despite the presence of defective bits in said memory. However, in such previously filed application there was means provided to check the parity of the bad bit word and means responsive to the lack of parity to correct said bad bit.

In another prior application entitled "Memory System for Using a Memory Despite the Presence of Defective Bits Therein" by assignee, filed Sept. 18, 1961 and having Ser. No. 138,644, several techniques were described and claimed for operating a defective memory by storing the address of an auxiliary memory location within the section of the defective memory location itself.

In a third prior application entitled "Automatic Data Correction for Batch Fabricated Memories" filed on Feb. 25, 1964 and having Ser. No. 347,206 and assigned to the same assignee as the instant application, a technique is described and claimed for arranging that all bits of the character located adjacent to a bad bit word are set to a predetermined same state, such grouping of bits in the same state serving as a code to identify an adjacent bad character.

The present invention is an improvement on all such previously filed inventions already identified. In the present application, several economical and yet effective systems are provided for detouring bad bit address locations and providing instead alternate address locations wherein correctly represented data is presented in readiness for reading out of a main or auxiliary memory.

Although in the present invention, the various systems described are involved with large memories having compensation controls and are understood to be of the kind fabricated by batch or mass production methods with inherent bad bit potentialities, it will be undertsood that in all corrective systems the accompanying correcting read only memories or auxiliary memories are of a more conventional individual capacitor or core element variety of the highest reliability without any elements of doubtful characteristics or tendencies toward imperfection.

The various systems of the present invention make it possible to use a memory that contains defective storage locations without replacing the entire array that contains the defective bad bit or bits. The bad memory portion can be detoured by the use of a correct portion without adding materially to the normal read write memory cycle time of a computer. The invention has particular application to memories manufactured by non-manual procedures and instead made economically by mass production techniques wherein a certain percentage of uncorrectable bits are understood to have a probability of existing in the completed memory, but it is not intended, nor would it be economical to discard such an entire memory once fabricated.

While the invention has been particularly shown and described with reference to preferred embodiments thereof, it will be understood by those skilled in the art that various changes in form and details may be made therein without departing from the spirit and scope of the invention.

What is claimed is:

1. A memory system including a main memory means for storing a plurality of multibit data composed of binary characters, wherein the binary bits forming some of said binary characters are bad, a first memory address register for selecting address locations of said main memory, a second memory address register with extra substitute address locations connected to said main memory, a large read only memory device having extra capacity with extra good address locations adapted to be substituted for address locations having defective bits, and means for directing an address corresponding to a main memory location with defective bits into a substitute position of said read only memory device and out to said second memory address register in the extra substitute address locations for changed interrogation of the main memory.

2. A memory system including a main memory means for storing a plurality of multibit words composed of binary characters wherein the binary bits forming some of said characters are defective, a panel manually pluggable from positions representative of main memory addresses with bad bits to substitute representations of words of good bits, a memory address register connected to said main memory and to said plugged panel in parallel, a redundant memory having bit elements of highest reliability as said substitute good bit representations holding words in readiness for substitution of bad bit words, and final substitution means under control of said plugged panel for calling in and substituting a selected redundant memory output for a main memory output whenever a register selection is that of a main memory address having bad bits.

3. A bad bit memory system comprising a main memory means for storing multibit words at discrete selectable addresses therein, some of said words being bad words containing a bad bit at the bit address therein such bad bit words being stored also at alternative positions having a substitute address for the same words comprised of good bits, a memory address register with address selecting codes therein and connections therefrom in series through a series of devices between said register and said main memory, a first of said series of devices comprising a read only memory containing address representations of both good and bad address representations, a second device connected in series with said read only memory and comprising an alternate address register holding both good and bad address locations, and a third device comprising a decoder between said alternate address register and said main memory for communicating both good and alternatives for bad address data to said main memory to direct the selection of an alternative address on the occasion of the selection of an address with bad memory bits.

4. A bad bit memory system comprising a main memory means for storing multibit words at discrete selectable addresses therein some of said words being bad words containing a bad bit at a bit address therein, said memory comprising alternate address positions for such bad bit words wherein said words are represented correctly by a full quota of good bits, a memory address register having a full complement of addresses for all of said words storable in said main memory, said register in addition having secondary substitute address selections to good substitute addresses for certain of the addresses found to have bad bits in the main memory storage, an output control device connected to said main memory whereby direct output is sustained on those occasions when addresses are selected for addresses comprising good bits, and output control means whereby output is withheld on the occasion of selection of an address containing bad bits, whereby time is afforded for a secondary parallel connection to reassert substitute address selection through said memory address register for a secondary address selection path through said main memory.

5. A memory system of the kind set forth in claim 1 wherein said read only memory address designations are allocated on decimal basis with a single bit for each address, a binary to decimal decoder between said first memory address register and said read only memory device, and a decimal to binary encoder between said read only memory device and said second memory address register.

6. The memory system of the kind set forth in claim 2 wherein said final substitution means includes drivers for both memories and a bad address decoder connected to said panel, said decoder having connections to an AND circuit to inhibit said main memory driver by controlling said AND circuit along with a timing control, and further provision of an OR output circuit between said main memory and said redundant memory to selectively operate under control of said redundant memory on the occasion of the presentation of an address with bad bits.

7. A memory system of the kind set forth in claim 4 wherein said parallel connections include a read only memory device comprising a storage position portion representative of good address positions and storage positions representative of alternatives for bad address positions, means under control of the device portion representative of good positions for controlling a gating line to sustain direct output of the main memory means through said output control device, and feedback connections from said read only memory device in selecting alternate addresses for bad addresses for feedback control of said main memory address register to select substitute addresses on the occasion of selection of addresses including bad bits in the main memory.

8. A memory system of the kind set forth in claim 7 wherein a pair of respective decoding devices are provided between said memory address register and said main memory means and said read only memory device, the connections to said decoding devices being in parallel from said memory address register, and wherein said read only memory device is of the type having reliable independent components.

9. A bad bit memory system comprising a main memory means for storing multibit words at discrete selectable addresses therein, some of said words being bad words and some of said words being good words each bad word having a similar corrected good word, means for selecting a word from memory, and means responsive to the selection of a bad word for withholding its output from the main memory and simultaneously selecting an address position containing a similar correctly readable good word.

References Cited

UNITED STATES PATENTS

| | | | |
|---|---|---|---|
| 3,222,653 | 12/1965 | Rice | 340—172.5 |
| 3,245,049 | 4/1966 | Sakalay | 340—172.5 |

PAUL J. HENON, *Primary Examiner.*

R. B. ZACHE, *Assistant Examiner.*